United States Patent [19]

Brownbridge

[11] Patent Number: 5,030,439
[45] Date of Patent: Jul. 9, 1991

[54] METHOD FOR PRODUCING PARTICULATE TITANIUM OXIDES

[75] Inventor: Thomas I. Brownbridge, Oklahoma City, Okla.

[73] Assignee: Kerr-McGee Chemical Corporation, Oklahoma City, Okla.

[21] Appl. No.: 422,536

[22] Filed: Oct. 17, 1989

[51] Int. Cl.$^5$ .................................. C01G 23/047
[52] U.S. Cl. ............................ 423/610; 423/611; 423/612
[58] Field of Search ................. 423/610, 611, 612

[56] References Cited

U.S. PATENT DOCUMENTS

| Re. 18,854 | 5/1933 | Blumfeld | 423/616 |
| 2,113,946 | 4/1938 | Plechner et al. | 423/612 |
| 3,341,291 | 9/1967 | Mabbs et al. | 423/610 |
| 3,533,742 | 10/1970 | Oster | 423/610 |
| 3,856,929 | 12/1974 | Angerman et al. | 423/610 |
| 4,021,533 | 5/1977 | Piccolo et al. | 423/610 |

FOREIGN PATENT DOCUMENTS 3534247 4/1951 United Kingdom ............... 423/611

Primary Examiner—Theodore Morris
Assistant Examiner—Edward Squillante
Attorney, Agent, or Firm—Herbert M. Hanegan; John P. Ward

[57] ABSTRACT

The invention relates to a method for the preparation of particulate pigmentary titanium dioxide. The method comprises reacting, in solution, a precursor titanium tetrahalide with sulfuric acid to produce an intermediate titanyl sulfate product. Following crystallization and recovery of this intermediate product from solution the crystallized intermediate is redissolved in an aqueous solvent medium and hydrolyzed at elevated temperatures to provide a particulate amorphous titanium dioxide intermediate product. After separation from the aqueous solvent medium, this intermediate product then is subjected to calcination at elevated temperatures to produce the desired particulate titanium dioxide end product.

30 Claims, 1 Drawing Sheet

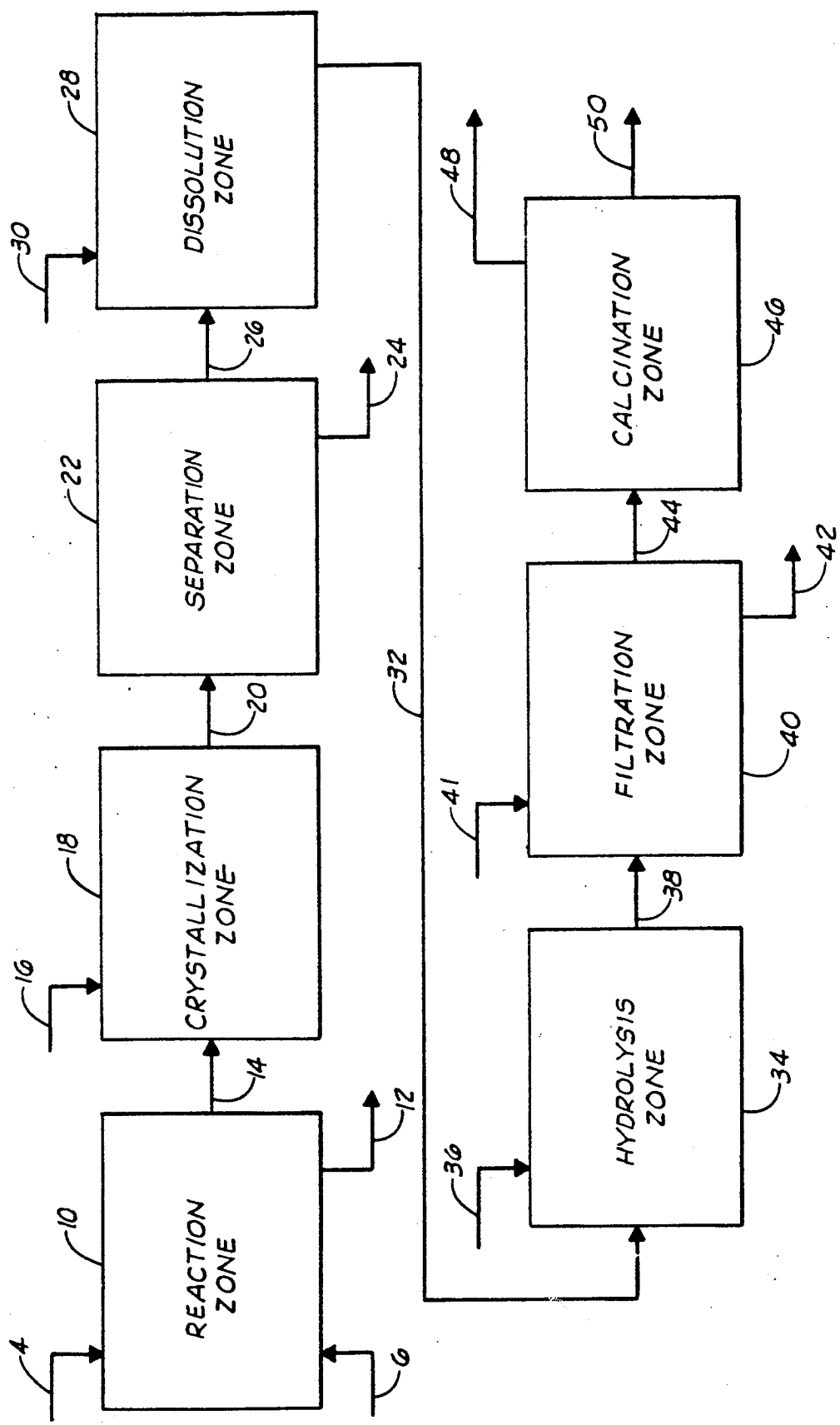

METHOD FOR PRODUCING PARTICULATE TITANIUM OXIDES

FIELD OF THE INVENTION

The present invention is directed to a novel method for producing particulate titanium dioxide from precursor titanium tetrahalides. More particularly, the present invention comprises a method for producing pigmentary titanium dioxide from titanium tetrachloride.

BACKGROUND OF THE INVENTION

Numerous methods have been developed for producing particulate titanium dioxide in general and pigmentary titanium dioxide in particular. Of the numerous methods developed, only two have gained any significant commercial importance. These two methods include the older so-called "sulfate process" and the more recent chloride process, both of which were developed specifically for use in the manufacture of pigmentary titanium dioxide. Of these two processes, the chloride process has become the process of choice by reason of the various advantages it offers over the sulfate process. One advantage of this process is that plants designed around this process are more economical to operate. Another advantage of the chloride process is that when utilized to manufacture pigmentary titanium dioxide, such pigments are cleaner, whiter and more durable than the titanium dioxide pigment products manufactured by the older sulfate process. One particularly important advantage of the chloride process over the sulfate process is that the former is significantly more environmentally acceptable than the latter.

Despite the aforementioned advantages of the chloride process, this particular process is not well suited to producing titanium dioxide pigment having an anatase crystalline structure and which structure is highly desirable in the titanium dioxide pigments utilized in the manufacture of such products as paper, fibers, ceramics and the like. Although chloride process produced titanium dioxide pigments which typically possess a rutile crystalline structure, can be used in these applications, such use often is undertaken with some measure of compromise. In other instances, however, such as in the delustering of various synthetic fibers, only titanium dioxide pigment of the anatase crystalline structure can be used. This is due, in the main, to the lower abrasivity inherent in titanium dioxide pigments having this particular crystalline structure.

Because of the need for pigmentary titanium dioxide of the anatase crystalline structure, the use of the sulfate process continues in spite of the environmental problems associated therewith. To remedy these environmental problems, which principally arise from the massive evolution of sulfuric acid gases and immense quantities of waste dilute sulfuric acid which are generated in the process, numerous solutions have been proposed. For example, two solutions which have been proposed and largely implemented throughout this industry to cope with the large quantities of waste dilute sulfuric acid produced are neutralization with calcium carbonate (which produces a calcium sulfate waste product) and concentration of the dilute acid to 95 to 98 percent sulfuric acid for reuse in the process. However, both of these solutions give rise to problems of their own. For instance, utilization of the first solution, i.e., neutralization, results typically in about one and three quarters parts by weight of waste calcium sulfate being produced for each part by weight of waste dilute acid (or equivalent amount of sulfate ions) neutralized, creating a serious disposal problem in its own right. Likewise, concentration of the waste dilute acid is quite costly in terms of energy, since about nine parts by weight of water must be evaporated for every part by weight of concentrated acid produced. Additionally, the quality of such concentrated acid generally is unacceptable for reuse in the process. This is due mainly to impurities such as chromium and manganese (resulting from the action of sulfuric acid or the original titanium bearing ore employed in the sulfate process) present in the concentrated acid and which impurities detrimentally effect the quality of the final pigment product.

From the above, it becomes clear that a need exists for a method by which pigmentary titanium dioxide products, particularly pigmentary titanium dioxide having the anatase crystalline structure can be produced and which method overcomes or avoids altogether the disadvantages inherent in the conventional sulfate process. The present invention provides such a method. Furthermore, the method of this invention has the versatility of not only being capable of producing pigmentary titanium dioxide having an anatase crystalline structure, but also titanium dioxide having the rutile crystalline structure.

SUMMARY OF THE INVENTION

The present invention comprises a wet method for producing particulate titanium dioxide from titanium tetrahalides. In accordance with this method, a first aqueous solution is formed comprised of a titanium tetrahalide and sulfuric acid as the principal reactants. This first aqueous solution is heated to an elevated temperature sufficient to effect reaction between the titanium tetrahalide and sulfuric acid reactants and to form in said first solution a dissolved intermediate product comprising a titanyl sulfate. Heating of this first solution containing the dissolved intermediate product is continued in the presence of a quantity of particulate titanyl sulfate whereby said dissolved intermediate product is caused to crystallize out of this first aqueous solution.

The resulting crystallized intermediate product of titanyl sulfate is separated from this first aqueous solution and thereafter redissolved in an aqueous solvent medium to form a second aqueous solution. In this stage of the method, the quantity of aqueous solvent medium employed will be an amount sufficient to effect dissolution of said crystallized titanyl sulfate but insufficient to cause hydrolysis of the titanyl sulfate.

Following dissolution of the crystallized titanyl sulfate, the second aqueous solution then is mixed with a further quantity of said aqueous solvent medium, each of the second aqueous solution and the further aqueous solvent medium being previously heated to an elevated temperature, whereby the redissolved titanyl sulfate is hydrolyzed to titanium dioxide. As heating of the mixed solution and hydrolysis of the titanyl sulfate therein is continued, the amorphous titanium dioxide thus formed precipitates from the mixed solution. After separating the precipitated titanium dioxide from the mixed solution, it then is subjected to calcination and the calcined particulate titanium dioxide product recovered substantially as produced.

DESCRIPTION OF THE DRAWING

The single FIGURE is a diagrammatical illustration of the flow of materials through the various stages of the novel wet method of the present invention.

DETAILED DESCRIPTION OF THE INVENTION

As disclosed hereinabove, the present invention relates to a novel wet method for preparing pigmentary or nonpigmentary particulate titanium dioxide having either the anatase or rutile crystalline structure utilizing any of the known titanium tetrahalides as starting materials. However, for purposes of simplifying the description and explanation of the use and operation of the method constituting the present invention, the method is described below particularly with regard to the production of particulate titanium dioxide utilizing titanium tetrachloride as the starting tetrahalide reactant.

With reference to the single FIGURE, titanium tetrachloride and an aqueous sulfuric acid solution are introduced, via conduits 4 and 6 respectively, into a reaction zone 10, wherein these materials are thoroughly mixed to form a first aqueous solution. Within the reaction zone 10, the first aqueous solution is maintained at temperatures ranging from about 25° C. to about the boiling point of the first aqueous solution, at the autogenous pressures prevailing within the zone 10 to effect reaction between the titanium tetrachloride and sulfuric acid materials contained in this solution and the formation of a soluble intermediate titanyl sulfate product and a hydrogen chloride gas byproduct. Preferably, the first aqueous solution contained in the reaction zone 10 will be maintained at temperatures ranging from about 65° C. to about 100° C. and within which range optimal reaction rates can be obtained.

In general, the concentration of the sulfuric acid in the first aqueous solution will be a concentration selected to minimize the solubility of the products of the reaction, i.e., the intermediate product of titanyl sulfate and hydrogen chloride gas byproduct, in the first aqueous solution. Broadly, the concentration of the sulfuric acid in the aqueous sulfuric acid solution employed in the present invention can range from about 60 to about 80 percent by weight, with those solutions containing from about 65 to about 75 percent by weight being preferred. The amount of the aqueous sulfuric acid solution employed will, of course, depend upon the concentration of the sulfuric acid in the particular aqueous solution employed. However, such amount always will be an amount sufficient to provide at least the stoichiometric amount of sulfuric acid required to effect complete reaction of the titanium tetrachloride reactant to the desired titanyl sulfate intermediate product. In general, however, the amount of the aqueous acid solution employed will be sufficient to provide an amount of sulfuric acid in excess of the stoichiometric amount required. In this regard, typically such excess amount of sulfuric acid can range from about one to about four times the stoichiometric amount required.

Reaction between the titanium tetrachloride and sulfuric acid contained in the first aqueous solution in reaction zone 10 proceeds rapidly, particularly at temperatures above about 65° C., with the evolution of the hydrogen chloride gas byproduct and the formation of the desired intermediate titanyl sulfate product. The byproduct hydrogen chloride gas is removed from the reaction zone 10 by way of a conduit 12, and can be passed through a scrubbing unit (not shown) wherein it is dried and then conveyed to a chlorine regeneration unit (not shown) for conversion to and recovery of chlorine gas.

As the reaction proceeds and the byproduct hydrogen chloride gas is removed from the reaction zone 10, the remainder of the first aqueous solution contained in said reaction zone 10 consists essentially of sulfuric acid, water and the dissolved intermediate product, i.e., the titanyl sulfate. This remaining first aqueous solution is withdrawn from the reaction zone 10 via a conduit 14 and is conveyed therein to a crystallization zone 18. Concurrent with the introduction of said remainder of said first aqueous solution, a dilute sulfuric acid solution recovered from a later stage in the method of this invention also is introduced through a conduit 16 into the crystallization zone 18. The amount of the dilute sulfuric acid solution (which solution contains from about 15 to about 35 percent by weight of sulfuric acid), introduced into the crystallization zone 18 will be an amount sufficient to reduce the sulfuric acid contained in the remainder of said first aqueous solution to a concentration in the range of from about 35 to about 50 percent by weight. Reduction of the sulfuric acid concentration of this first aqueous solution to these levels is critical if a readily filterable solution of the hereinafter described crystallized titanyl sulfate intermediate product is to be obtained.

Within said crystallization zone 18, the diluted aqueous solution is maintained at a temperature higher than the temperature maintained in the reaction zone 10. In a preferred embodiment, this diluted aqueous solution is maintained at a temperature equal to about its boiling point which, at sulfuric acid concentrations of from about 35 to about 50 percent by weight, will typically range from about 108° C. to about 125° C.

To facilitate the crystallization of the dissolved titanyl sulfate intermediate product from the first aqueous solution, the crystallization will be carried out in the presence of an amount of a particulate titanyl sulfate which, preferably, previously has been prepared through the utilization of the method of this invention. Typically, the amount of the particulate titanyl sulfate present in the crystallization zone 18 will range from about 0.1 to about 20 percent by weight based on the total weight of the diluted aqueous solution contained in the crystallization zone 18.

Upon completion of the crystallization of the dissolved titanyl sulfate intermediate product, the diluted aqueous solution containing the crystallized intermediate product is transferred from the crystallization zone 18 via a conduit 20 to a separation zone 22 wherein the crystallized intermediate product is separated and recovered from the diluted aqueous solution (or mother liquor). Typically, this separation and recovery can be most effectively accomplished by subjecting the diluted aqueous solution having the crystallized intermediate product suspended therein to filtration under superatmospheric pressures. Pressure filtration and apparatus for performing such filtrations are known. Thus, in the practice of this invention, the separation zone 22 typically comprises apparatus such as, for instance, plate and frame filter presses, recessed plate filter presses, pressure leaf filters, and the like. A more complete listing and description of such pressure filter presses can be found in Perry's Chemical Engineer's Handbook, Section 19, pp. 62-73, 4th Ed. (1963). When the method of the present invention is operated on a semi-continuous or continuous basis, however, particularly useful pressure filter presses are the vertically positioned filter presses manufactured by B.C. Hoesch, Inc. These Hoesch filter presses combine the desirable characteristics of conventional filter presses with the advantage of rotary and belt filters, and also can be fully automated.

Regardless of the particular type or design of filter press apparatus employed in the separation zone 22, such apparatus will be operated at pressures in excess of atmospheric pressure. In general, such pressures will be those pressures sufficient to provide wet filter cakes containing residual mother liquor and the crystallized intermediate product in weight ratios of about 2.0/1.0 and less and preferably from about 0.2/1.0 to about 1.0/1.0. Typically, pressures suitable for providing wet filter cakes containing the above disclosed weight ratios can range from about 100 to about 300 psi (i.e., about 7 to about 22 kg/cm$^2$) and preferably from about 150 to about 250 psi (i.e., about 10 to about 17 kg/cm$^2$).

The mother liquor separated from the crystallized intermediate product within the separation zone 22 is withdrawn therefrom by way of a conduit 24 and conveyed via the conduit 24 to a sulfuric acid concentration zone (not shown). The wet filter cake produced in the separation zone 24 and comprised of residual mother liquor and the crystallized intermediate product in the weight ratios disclosed above then is withdrawn from said separation zone 22 via a conduit 26.

From the separation zone 22, the wet filter cake is conveyed via the conduit 26 to a dissolution zone 28, which can comprise a simple stirred vessel or tank. Within the dissolution zone 28 the wet filter cake will be mixed with an amount of an aqueous solvent medium such as water, introduced into the dissolution zone 28 through a conduit 30, sufficient to dissolve the crystallized intermediate product contained in the wet filter cake, but insufficient to cause premature hydrolysis of the crystallized intermediate product. Generally, such mixing and dissolution will be carried out at ambient temperatures using the aqueous solvent medium, e.g. water, in amounts ranging from about 3 to about 50 percent by weight based on the weight of the crystallized intermediate product contained in the wet filter cake being subjected to hydrolysis.

The resulting solution (or second aqueous solution) comprising the aqueous solvent medium, residual mother liquor and the redissolved titanyl sulfate intermediate product then is withdrawn from said dissolution zone 28 by means of a conduit 32 and conveyed therein to a hydrolysis zone 34. In a preferred embodiment of this invention, the second aqueous solution will, however, first be subjected to a polish filtration (by means not shown) prior to its introduction into the hydrolysis zone 34. The purpose of this polish filtration step is to remove any solid impurities which may be present in the second aqueous solution and which impurities could adversely affect the final properties of the final particulate titanium dioxide product. To accomplish this filtration, any conventional filtering apparatus useful for the filtration of liquid materials can be employed, including both gravity-, vacuum- and pressure-type filters.

Within the hydrolysis zone 34, the second aqueous solution, which has been heated to an elevated temperature (by means not shown) of from about 85° C. to about 105° C., is added to and mixed with a further amount of the aqueous solvent medium, e.g., water. This further aqueous solvent medium, which also is heated to an elevated temperature (by means not shown) of from about 85° C. to about 105° C. is introduced into said hydrolysis zone 34 via a conduit 36. Broadly, the amount of the further aqueous solvent medium to which the second aqueous solution is added will range from 1.0 to about 30.0 percent by volume based on the combined volume of the further aqueous solvent medium and second aqueous solution and preferably from about 10.0 to about 25.0 percent by volume.

Within the hydrolysis zone 34, the hydrolysis is carried out in the presence of an amount of seed nuclei or particles of titanium dioxide which, among others, provide for an acceleration in the rate of hydrolysis of the titanyl sulfate intermediate to the particulate amorphous titanium dioxide intermediate product and for control over the optimum particle sizes and (depending on whether the seed nuclei or particles are anatase or rutile inducing) the crystalline structure desired in the final particulate titanium dioxide product. For the purposes of the present invention, such seed nuclei or particles either can be prepared external to the hydrolysis zone 34 such as by the thermal hydrolysis of aqueous titanium tetrachloride and then added thereto by way of a conduit (not shown) or produced in situ within the hydrolysis zone 34 in accordance with known techniques such as described below. In either instance, the amount of the seed nuclei or particles of titanium dioxide present in the combined second aqueous solution and further aqueous solvent medium in the hydrolysis zone 34 broadly will range from about 0.1 to about 10.0 percent by weight based upon the weight of the aqueous combination. Preferably, the amount of said seed nuclei or particles present, whether prepared externally to the hydrolysis zone 34 and then added thereto or produced in situ, will range from about 0.1 to about 5.0 percent by weight.

In one particularly convenient embodiment of the present invention for the preparation of particulate titanium dioxide having the anatase crystalline structure, the above described hydrolysis is carried out in the presence of titanium dioxide seed nuclei or particles generated in situ within said hydrolysis zone 34. Typical conditions required for accomplishing the in situ production of such seed nuclei or particles and the hydrolysis of the remaining dissolved intermediate product are disclosed in U.S. Reissue Pat. No. 18,854, the teachings of which are incorporated herein by reference. In general, the heated second aqueous solution is slowly added to a heated further quantity of the aqueous solvent medium at a predetermined rate. Once completely combined and subsequent to the formation of the seed nuclei or particles of titanium dioxide, the resulting solution contained in the hydrolysis zone 34 is maintained at elevated temperatures in the range of from at least about 90° C. and preferably from at least about 100° C. up to about the boiling point of the solution. This heated solution is maintained at these elevated temperatures for a period sufficient to permit completion of the hydrolysis reaction. In this regard, typical hydrolysis times can range from about 1 to about 4 hours to achieve complete or substantially complete hydrolysis of the dissolved intermediate product (i.e., the titanyl sulfate) to a particulate amorphous titanium dioxide intermediate product.

In a further embodiment of the present invention for preparing particulate titanium dioxide product of either the anatase or the rutile crystalline structure, the above described hydrolysis step also can be carried out utilizing seed nuclei or particles of titanium dioxide prepared external to the hydrolysis zone 34. These externally prepared seed nuclei or particles, which can be either anatase or rutile inducing depending upon the method by which they are prepared, can be introduced into the hydrolysis zone 34 through a conduit not shown. These externally prepared seed nuclei or particles thus can be designed to yield titanium dioxide pigment products, upon the subsequent calcination of the amorphous titanium dioxide intermediate product recovered from the hydrolysis step, having either the anatase or rutile crystalline structure.

Hydrolysis of the titanyl sulfate intermediate product to the particulate amorphous titanium dioxide intermediate product in the presence of either the internally generated or externally prepared seed particles results in the formation of an aqueous slurry containing a solids content of said intermediate product ranging from about 10 to about 30 percent by weight. This slurry is recovered from the hydrolysis zone 34 via a conduit 38 and is conveyed through the conduit 38 to a filtration zone 40 which can comprise, for instance, a drum-type vacuum filter apparatus. Within the filtration zone 40 a substantial portion of both the aqueous solvent medium and residual sulfuric acid (originating from the mother liquor contained in the above described filter cake) of the slurry is removed via a conduit 42 and a filter cake containing the particulate amorphous titanium dioxide intermediate product is produced. During this filtration step, the filter cake being produced is subjected to washing to remove any remaining residual sulfuric acid entrapped within the filter cake. Washing of the filter cake can be effected by the introduction of further quantities of the aqueous solvent medium, i.e., water, into the filtration zone 40 by way of a conduit 41.

The washed filter cake is recovered from said filtration zone 40 via a line 44 and conveyed thereby to a calcination zone 46. Although not shown, prior to the introduction of the filter cake into the calcination zone 46, it generally is desirable to blend into the filter cake certain additive agents. Such additive agents can include various known materials utilized to develop a variety of characteristics and properties in the finished pigment such as, for instance, the particular crystalline structure of the titanium dioxide product, the particular particle size desired as well as to prevent sintering of the individual particles of the amorphous titanium dioxide intermediate product during the calcination thereof. Representative, but nonlimiting, examples of such additive agents include, for instance, rutile titanium dioxide seed nuclei or particles, alkali metal salts such as potassium chloride, potassium sulfate, and the like, and phosphorus containing compounds such as phosphoric acid, and the like. The amounts of such additive agents employed, while small, can vary widely from about 0 to about 10.0 percent by weight based on the weight of the amorphous titanium dioxide intermediate product contained in the filter cake. Good results can be obtained when the amounts of such additive agents are within the range of from about 2.0 to about 6.0 percent by weight for the rutile titanium dioxide seed nuclei or particles and from about 0.1 to about 0.75 percent by weight for the alkali metal salts and phosphorus containing compounds expressed as the oxides thereof such as, for example, $K_2O$ and $P_2O_5$.

Within the calcination zone 46, which zone can comprise, for instance, a rotary kiln, the filter cake is heated to a temperature in the range of from about 800° C. to about 1000° C. and preferably from about 850° C. to about 950° C. Typically, the residence time required within the calcination zone 46 for developing the particular crystalline structure and other properties required in the calcined particulate titanium dioxide product will range from about 6 to about 12 hours. During calcination of the filter cake, off gases such as water vapor, vaporized sulfuric acid and any other volatilizable materials present in the filter cake introduced into the calcination zone 46 via a conduit 48. The completely calcined particulate titanium dioxide product is withdrawn from the calcination zone 46 via a line 50. This recovered calcined particulate product subsequently can be further processed such as by milling surface treatment, and the like, to produce finished particulate titanium dioxide products having a variety of end uses.

While the present invention has been described with respect to what at present is considered to be the preferred embodiments thereof, it is to be understood that modifications and changes can be made thereto without departing from the spirit and scope of the invention as described above and as defined in the following claims.

What is claimed is:

1. A method for producing particulate titanium dioxide from titanium tetrahalides comprising the steps of:
    forming a first aqueous solution comprised of a titanium tetrahalide and sulfuric acid and heating said first aqueous solution to a sufficiently elevated temperature whereby said titanium tetrahalide and said sulfuric acid react to produce in said first solution a dissolved intermediate product comprising titanyl sulfate and to produce a byproduct hydrogen halide gas;
    continuing the heating of said first aqueous solution at an elevated temperature and in the presence of a quantity of a previously prepared particulate titanyl sulfate whereby said dissolved titanyl sulfate intermediate is caused to crystallize from said first aqueous solution;
    separating said crystallized titanyl sulfate intermediate from said first aqueous solution to produce a wet filter cake comprising residual mother liquor and said crystallized titanyl sulfate intermediate;
    forming a second aqueous solution comprised of said filter cake dissolved in a quantity of an aqueous solvent medium, said quantity being sufficient to effect dissolution of the crystallized titanyl sulfate intermediate contained in said filter cake, but insufficient to effect hydrolysis thereof;
    subjecting said dissolved crystallized titanyl sulfate intermediate to hydrolysis by combining said second aqueous solution with a further quantity of said aqueous solvent medium heated to an elevated temperature whereby said dissolved crystallized titanyl sulfate intermediate contained in said second solution is hydrolyzed to produce a particulate amorphous titanium dioxide intermediate;
    separating said particulate amorphous titanium dioxide intermediate to provide a particulate crystalline titanium dioxide product and recovering said crystalline product substantially as produced.

2. The method of claim 1 wherein the titanium tetrahalide is titanium tetrachloride and said byproduct hydrogen halide gas is hydrogen chloride.

3. The method of claim 1 wherein said sulfuric acid is present in said first aqueous solution in a concentration ranging from about 60 to about 80 percent by weight based on the weight of said first solution.

4. The method of claim 1 wherein said first aqueous solution is heated to an elevated temperature in the range of from about 25° C. up to about the boiling point of said first aqueous solution.

5. The method of claim 1 wherein said continued heating of said first aqueous solution in the presence of said quantity of said particulate titanyl sulfate comprises heating the first aqueous solution at the boiling point of said first aqueous solution.

6. The method of claim 1 wherein said quantity of said particulate titanyl sulfate present in said first aqueous solution comprises a quantity sufficient to effect initiation of the crystallization of said dissolved titanyl sulfate intermediate.

7. The method of claim 6 wherein said quantity ranges from about 0.1 to about 20 percent by weight based on the weight of the first aqueous solution.

8. The method of claim 1 wherein during said continued heating of said first aqueous solution the concentration of the sulfuric acid contained therein is reduced.

9. The method of claim 8 wherein said concentration of said sulfuric acid is reduced by addition to said first aqueous solution of a quantity of a dilute sulfuric acid solution.

10. The method of claim 9 wherein said added dilute sulfuric acid solution contains a sulfuric acid concentration ranging from about 15 to about 35 percent by weight.

11. The method of claim 9 wherein said added quantity of said dilute acid solution is an amount sufficient to reduce the concentration of said sulfuric acid in said first aqueous solution to a concentration in the range of from about 35 to about 50 percent by weight.

12. The method of claim 1 wherein said separation of said crystallized titanyl sulfate intermediate from said first aqueous solution comprises subjecting said first solution to filtration under superatmospheric pressures to produce the wet filter cake containing the residual mother liquor and the titanyl sulfate intermediate.

13. The method of claim 12 wherein said wet filter cake contains said residual mother liquor and said titanyl sulfate intermediate in weight ratios of about 2/1 and less.

14. The method of claim 1 wherein said aqueous solvent medium of said second aqueous solution comprises water.

15. The method of claim 1 wherein said quantity of said aqueous solvent medium ranges from about 3 to about 50 percent by weight based on the weight of the titanyl sulfate intermediate contained in said wet filter cake.

16. The method of claim 1 wherein each of said second aqueous solution containing said residual mother liquor and said dissolved titanyl sulfate intermediate and said further quantity of said aqueous solvent medium are heated to an elevated temperature prior to the combining thereof.

17. The method of claim 16 wherein each of said second aqueous solution and said further quantity of said aqueous solvent medium each are heated to a temperature ranging from about 85 to about 105° C. prior to the combining thereof.

18. The method of claim 1 wherein subsequent to the combining of said second aqueous solution and said further quantity of said aqueous solvent medium said combination is heated to a temperature ranging from at least about 90° C. to about the boiling point of said combination.

19. The method of claim 1 wherein said hydrolysis of said dissolved crystallized titanyl sulfate intermediate is performed in the presence of a quantity of seed nuclei or particles of titanium dioxide.

20. The method of claim 19 wherein said quantity of said seed nuclei or particles of titanium dioxide comprises a quantity sufficient to effect initiation of hydrolysis of said dissolved titanyl sulfate intermediate.

21. The method of claim 20 wherein the quantity of said nuclei or particles of titanium dioxide ranges from about 0.1 to about 10 percent by weight based on the combined weight of said second aqueous solution and said further aqueous solvent medium.

22. The method of claim 19 wherein the quantity of said seed nuclei or particles of particulate titanium dioxide is formed in situ in the combination of said second aqueous solution and said further quantity of said aqueous solvent medium.

23. The method of claim 1 wherein at least one additive agent is blended into said particulate amorphous titanium dioxide intermediate.

24. The method of claim 23 wherein said additive agent is a material selected from the group consisting of alkali metal salts, phosphorus containing compounds and seed nuclei or particles of rutile titanium dioxide.

25. The method of claim 23 wherein said additive agent is blended into said particulate amorphous titanium dioxide intermediate in an amount ranging from about 0.1 to about 10.0 percent by weight based on the weight of the amorphous titanium dioxide intermediate.

26. The method of claim 1 wherein said particulate amorphous titanium dioxide intermediate is calcined at temperatures ranging from about 800° C. to about 1000° C.

27. The method of claim 2 which is further characterized to include the step of converting said byproduct hydrogen chloride gas to chlorine gas.

28. The method of claim 27 wherein the step of separating said particulate amphorous titanium dioxide intermediate from said aqueous solvent medium is by filtration.

29. The method of claim 9 wherein said dilute sulfuric acid solution comprises the aqueous solvent medium separated from said particulate amphorous titanium dioxide intermediate.

30. The method of claim 29 wherein said first aqueous solution separated from said crystallized titanyl sulfate intermediate is conducted to a sulfuric acid concentration zone for reuse in forming said first aqueous solution.

* * * * *